3,766,156
UNSATURATED QUATERNARY MONOMERS
AND POLYMERS
Benjamin B. Kine, Elkins Park, and William D. Emmons, Huntingdon Valley, Pa., assignors to Rohm and Haas Company, Philadelphia, Pa.
No Drawing. Filed Dec. 14, 1970, Ser. No. 98,060
Int. Cl. C08f 3/64, 3/66, 15/16
U.S. Cl. 260—86.1 N          5 Claims

ABSTRACT OF THE DISCLOSURE

This invention is concerned with monoethylenically unsaturated acid ester monomers, such as those of acrylic or methacrylic acid, containing a bis-quaternary ammonium halide group of the formula

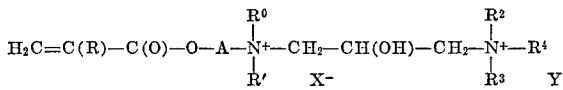

R being H or methyl,
A being $(C_2-C_6)$-alkylene,
$R^0$ being lower alkyl,
$R'$ being lower alkyl,
$R^2$ being lower alkyl,
$R^3$ being lower alkyl,
$R^4$ being lower alkyl,
X being an anion, and
Y being an anion.

It is also concerned with addition polymers of such monomers, and methods of producing the monomers and polymers. The monomers and polymers are reasonably stable at both alkaline and acid pH values under normal temperature and pressure conditions although capable of reacting with other reactants for the hydroxyl groups in the linkage of the quaternary nitrogen groups. The invention also concerns the use of these monomers and polymers as antistatic agents for textiles and other articles formed of hydrophobic materials, as wet-strength agents in making paper and as electroconductive aids in the making of various electroconductive papers for electrostatic image reproduction systems.

In accordance with the present invention, there are provided monomers of the following general formula:

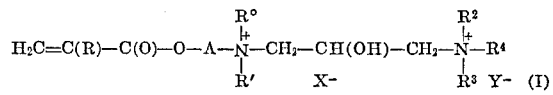

wherein
A is $(C_2-C_6)$-alkylene,
R is H or methyl,
$R^0$ is lower alkyl, i.e. $(C_1-C_4)$-alkyl,
$R'$ is lower alkyl,
$R^2$ is lower alkyl,
$R^3$ is lower alkyl,
$R^4$ is lower alkyl,
X is an anion, preferably a halide ion, and
Y is an anion, preferably a halide ion.

The monomers may be made in various ways. For example they may be made by reacting a (2,3-epoxypropyl) trialkylammonium halide, either the chloride, bromide, fluoride, or iodide, with a dialkylaminoalkyl acrylate or methacrylate and a hydrohalide salt. The reaction may be effected in bulk when either of the reactants has at least partial solubility in the other. Alternatively, the reactants may be dissolved in water or other appropriate polar solvent, such as alcohols, such as methanol, ethanol, isopropanol and isobutanol, benzene, toluene, xylene, aceto-nitrile, dimethylformamide, acetamide, dimethylacetamide, acetone, dioxane, methyl isobutyl ketone and so on. Mixtures of solvents may be used. For example mixtures of water and one of the organic solvents mentioned whether miscible with the water or not, may be used. In some instances reaction may occur at room temperature but generally, it is preferable to heat the mixture of reactants to temperatures of 40° C. to the reflux temperature of the reaction system which may be as high as 100° to 130° C. or higher. Generally, it is preferred to employ reaction temperatures of 50° to 80° C. The time required to effect the extent of quaternization desired depends, among other things, on the temperature. At room temperature, several days or a week may be needed whereas at reflux, the time required may be only a few minutes to an hour or more. The mixture is preferably stirred continually or continuously. The reactants may be used in an equimolar ratio. However, it may in some instances be desirable to use only a fraction of the full equivalent amount of the quaternary ammonium halide so that only a portion of the dialkylaminoalkyl acrylate or methacrylate is quaternized thereby. On polymerization of the resulting partially quaternized monomer, a copolymer is obtained containing units of unquaternized as well as quaternized monomer.

When aqueous or alcoholic media are used for the reaction, it may be desirable to maintain the pH of the system at or near 7. This serves to control the speed of reaction and inhibit any hydrolysis of the monomeric ester. The product may be recovered, when a solvent is used in making it, by evaporating the solvent. If the product is precipitated in the medium, it may be filtered. If desired, the product may be converted to the salt form by the addition of an acid, such as hydrochloric acid, nitric acid, or the like before removal of solvent.

Examples of amine-containing compounds that can be alkylated to produce the monomers of Formula I are:

dimethylaminoethyl acrylate or methacrylate
3-(dimethylamino)propyl acrylate or methacrylate
2-(dimethylamino)propyl acrylate or methacrylate
4-(dimethylamino)butyl acrylate or methacrylate
5-(dimethylamino)pentyl acrylate or methacrylate
6-(dimethylamino)hexyl acrylate or methacrylate
2-(dimethylamino)butyl acrylate or methacrylate
3-(dimethylamino)butyl acrylate or methacrylate
2-(dimethylamino)pentyl acrylate or methacrylate
3-(dimethylamino)pentyl acrylate or methacrylate
4-(dimethylamino)pentyl acrylate or methacrylate
2-(dimethylamino)hexyl acrylate or methacrylate
3-(dimethylamino)hexyl acrylate or methacrylate
4-(dimethylamino)hexyl acrylate or methacrylate
5-(dimethylamino)hexyl acrylate or methacrylate
2-methyl-3-(dimethylamino)propyl acrylate or methacrylate
diethylaminoethyl acrylate or methacrylate
dipropylaminoethyl acrylate or methacrylate
dibutylaminoethyl acrylate or methacrylate
diisopropylaminoethyl acrylate or methacrylate For preparing monomers of Formula I, examples of alkylating agents that may be used in the method described above are:

2,3-epoxypropyltrimethylammonium chloride, bromide, iodide, or fluoride,
2,3-epoxypropyltriethylammonium chloride,
2,3-epoxypropyltripropylammonium chloride,
2,3-epoxypropyltriisopropylammonium chloride,
2,3-epoxypropyltributylammonium chloride,
2,3-epoxypropylethyldimethylammonium chloride,
2,3-epoxypropyldiethylmethylammonium chloride,
2,3-epoxypropylethylbutylmethylammonium chloride.

By the reactions mentioned hereinabove, there are generally obtained monomers of Formula I in which the anions are of halide type. The other quaternary salts and the hydroxide may be obtained if desired, by subjecting a solution of the bis-quaternary monomer in the halide form to ion exchange using an exchange resin having the appropriate anion that is desired. Examples of various anions for X and Y include nitrate, sulfate, monosodium acid sulfate, chromate, phosphate, methyl sulfate, acetate, formate, oxalate, sulfamate, acrylate, α-methacryloxyacetate, and so on. These conversions to the various salts and the hydroxyl ion form occur at room temperature as well as above it and considerably below it.

The monomers of Formula I are directly useful for copolymerization with acrylonitrile to modify the antistatic, dyeing, and moisture-regain properties thereof. The resulting copolymer containing 0.2 to 5% by weight of the quaternary ammonium compound of the present invention can be formed into fibers which can be formed into textile yarns and fabric which show reduced tendency to develop static charges on frictional contact, better dyeing, especially by acid dyes, and better feel because of increased moisture adsorption or regain. Instead of copolymerizing the monomer of the invention directly with the acrylonitrile to form the main component of fibers or films, a homopolymer or copolymer of the monomer of Formula I with one or more other monomers, such as vinyl acetate, ethyl acrylate, styrene or vinyl benzene sulfonate, may be blended in relatively small amount with the acrylonitrile polymer which forms the predominant components of the fiber or film that is subsequently formed from the blend.

A compound of Formula I may be used for the treatment of paper to apply a cationic charge to it or to render it electroconductive. A small amount in the range of 0.2 to 5% or more by weight of the compound based on dry fiber weight, may be mixed into the paper pulp in the beater or shortly before or after the pulp leaves the beater. A polymerization initiator may be added to the pulp at the same time or shortly before or after the addition of the monomer of Formula I. The effect obtained in the dry paper may be varied by including other comonomers. For example, there may be used a mixture of monomers comprising about 0.5% to about 95% by weight of at least one monomer of Formula I with a reactive monomer which by reacting with itself and/or with the paper bonds the resulting copolymer to the paper permanently and/or cross-links the copolymer. The amount of such reactive monomer may be about 0.5 to 20% by weight of the monomer mixture. In addition, there may be present up to 99% by weight of the mixture of neutral, or non-ionic comonomers, such as ($C_1$–$C_{18}$) alkyl acrylates or methacrylates, e.g. ethyl, butyl or methyl acrylate or methacrylate, acrylonitrile, acrylamide, methacrylamide, styrene, vinyl acetate, vinyl chloride, etc. The reactive monomer used may be N-methylolacrylamide or N-methylolacrylamide or it may be a monomer containing a vic-epoxy group such as glycidyl acrylate or methacrylate or a monomer containing a quaternary ammonium group, one of the substituents of which is a glycidyl group or is convertible thereto before or after polymerization such as the monomers of Formulas VI and VII of copending U.S. application Ser. No. 74,499, filed Sept. 22, 1970 and of Formula III of copending U.S. application Ser. No. 813,724, filed Apr. 4, 1969, now U.S. Pat. 3,678,098 both in the hands of an assignee common to the present application. The monomers of the formulas mentioned are as follows:

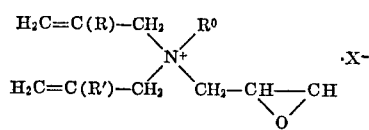

(VI)

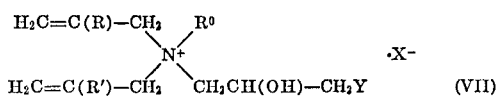

(VII)

wherein

R is hydrogen or methyl,

R′ is hydrogen or methyl, and $R^0$ is an alkyl group having 1 to 8 carbon atoms, an aryl group having 6 to 8 carbon atoms, or a hydroxyalkyl group having 1 to 8 carbon atoms, Y is a halogen, such as chlorine, fluorine, bromine or iodine, and $X^-$ is an anion such as $F^-$, $Cl^-$, $Br^-$, $I^-$, $OH^-$, $RCOO^-$, $SO_4^=$, $NO_3^-$, $ClO_4^-$, $PO_4^=$, or $RSO_3^-$, R being a phenyl or a lower alkyl group of 1 to 4 carbon atoms.

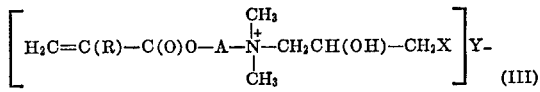  (III)

wherein A is a ($C_2$–$C_6$) alkylene group having at least two carbon atoms in a chain between the adjoined O and N atoms or A may be a polyoxyethylene group of the formula

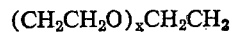

wherein x is 1 to 11 or more,

R is hydrogen or methyl

X is chlorine, bromine, or iodine and

Y is an anion, such as a halogen ion ($Cl^-$, $Br^-$, or $I^-$) or the anion of any other acid, such as phosphate, acid phosphate, sulfate, bisulfate, methyl sulfate, carboxylate, nitrate, sulfonate, sulfamate, acetate, formate, oxalate, acrylate, and α-methacryloxyacetate.

The copolymers containing monomer units of Formula I herein and a glycidyl group of one of the formulas just mentioned are applied in the same way and under the same conditions as described in the earlier copending applications. Such treated papers may have a sizing effect and often higher wet strength as well as dry strength, the effect varying in dependence on the pH of the treating system.

In either case an aqueous dispersion of neutral or acid-containing polymers such as poly(ethyl acrylate) obtained by emulsion polymerization may also be added to the pulp. In such event the monomer of Formula I, or a polymer formed thereof in situ serves to anchor the additional polymer to the fibers. Instead of such additional polymer, there may be added an aqueous dispersion of a wax, such as polyethylene, of a pigment or mineral filler, or of a material, such as a long chain alcohol-modified urea formaldehyde resin, which on subsequent calendering of the paper serves to transparentize it.

The monomeric products of Formula I are polymerizable and for this purpose, their aqueous solutions may be used directly. Any known polymerization initiator of free radical type effective in aqueous systems can be used. Examples are t-butyl hydroperoxide, ammonium persulfate, and alkali metal persulfates, such as those of sodium or potassium. They are used at the customary dosage of 0.1 to 2% by weight, based on monomer weight. They may be used with sodium hydrosulfite or other reducing agents in redox systems. Instead, the polymerization may be effected by radiation.

These new quaternary ammonium salt monomers may be copolymerized with other polymerizable ethylenically unsaturated monomers, especially by emulsion polymerization procedures, using the initiators or redox systems just mentioned in conjunction, if desired, with suitable emulsifiers of nonionic or cationic type. As emulsifiers, there may be used t-octyl- or t-nonyl-phenoxypolyethoxyethanols having from about 10 to 50 or more oxyethylene groups, octadecylamine sulfate, cyclohexyldiethyl(dodecyl)amine sulfate, octadecyltrimethylammonium bromide, polyethoxyamines or mixtures of two or more such emulsifiers.

Any ethylenically unsaturated monomer having a group $H_2C=C<$ may be used for copolymerization with the new monomers of Formula I. Examples of monoethylenically unsaturated monomers having a single

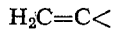

group include α,β-monoethylenically unsaturated acids, such as acrylic acid, methacrylic acid, itaconic acid, methacryloxypropionic acid, maleic acid, and fumaric acid; vinyl esters of $(C_1-C_{18})$ aliphatic acids, such as vinyl acetate, laurate, or stearate; esters of acrylic acid or methacrylic acid with $(C_1-C_{18})$ alcohols, including $(C_1-C_{18})$ alcohols, benzyl alcohols, cyclohexyl alcohol, and isobornyl alcohol, such as methyl acrylate or methacrylate, ethyl acrylate or methacrylate, butyl acrylate or methacrylate, 2-ethylhexyl acrylate or methacrylate, octadecyl acrylate or methacrylate, hydroxymethyl methacrylate, hydroxypropyl methacrylate, methoxyethyloxethyl acrylate, or methacrylate, ethoxyethoxyethyl acrylate or methacrylate, methoxyethyl acrylate or methacrylate, ethoxyethyl acrylate or methacrylate; vinyl aromatic hydrocarbons (e.g. styrene, isopropenyl toluene, and various dialkyl styrenes); acrylonitrile, methacrylonitrile, ethacrylonitrile, and phenylacrylonitrile; acrylamide, methacrylamide, ethacrylamide, N - methylol acrylamide, N-monoalkyl and -dialkyl acrylamides and methacrylamides, e.g., N - monomethyl, -ethyl, -propyl, -butyl, and N,N, - dimethyl, -dipropyl, or -dibutyl acrylamides; N-monophenyl- and N,N-diphenyl-acrylamides and -methacrylamides; vinyl ethers, such as butyl vinyl ethyl; N-vinyl lactams such as N-vinyl pyrrolidone; and olefins, such as ethylene; fluorinated vinyl compounds; such as vinylidene fluoride; α-hydroxyethyl acrylate or methacrylate, dimethylaminoethyl acrylate or methacrylate of any of the hydroxyl-containing or amine-containing monomers mentioned in columns 2 and 3 of U.S. Pat. 3,150,-112; vinyl chloride and vinylidene chloride; alkyl vinyl ketones; e.g., methyl vinyl ketone, ethyl vinyl ketone, and methyl isopropenyl ketone; itaconic diesters containing a single $CH_2=C<$ grouping, e.g., the dimethyl, diethyl, dipropyl, dibutyl and other saturated aliphatic monohydric alcohol diesters of itaconic acid, diphenyl itaconate, dibenzyl itaconate, di-(phenylethyl) itaconate; allyl, and methallyl acetates, allyl and methallyl and methallyl propionates, allyl and methallyl valerates; vinyl thiophene; 4-vinyl pyridine; vinyl pyrrole; and ethylenically unsaturated monomers containing a quaternary ammonium group, such as methacryloxyethyl trimethyl ammonium chloride and acryloxyethyl trimethyl ammonium chloride.

An alternative method of preparing the polymers of the present invention is to react one or more of the several alkylating agents mentioned hereinabove with a polymer containing from 0.25% to 100% by weight of an amine of Formula II or one of its salts.

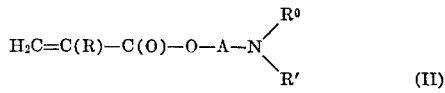

Numerous methods of polymerizing (including copolymerizing within the meaning of this term) the amines (or their salts) of Formula II are well known and any of these methods may be used. Conventional bulk, solution, emulsion, or suspension polymerization techniques may be employed. Any of the comonomers listed above for copolymerization with the quaternary ammonium compound of Formula I may be used as comonomers with the amines of Formula II or their salts.

The reaction of the alkylating agent or mixture thereof with the polymer salt may be carried out in the same way and under the same conditions as that of the alkylating agent or mixture thereof with the amine monomer i.e. in free base form, or in the form of its salt. The polymer as obtained may be in the form of a solution in water or a suitable organic solvent or it may be present in the form of an aqueous latex obtained by emulsion polymerization. The alkylating agent is used in the stoichiometric equivalent proportion of convert whatever proportion of amine units in the polymer to quaternary ammonium units that is desired, or an excess up to 100% may be used.

Homopolymers of a compound of Formula I and copolymers containing 25% by weight or more, and preferably containing 60 to 95% by weight, of units derived from one or more monomers of Formula I are generally water-soluble to an extent of at least 1% by weight at room temperature and in most cases dissolve to form aqueous solutions containing as much as 20% or more, the greater the concentration, the greater the viscosity.

The water-soluble homopolymers and copolymers containing 25% by weight or more, and preferably containing 60 to 95% by weight, of units derived from one or more monomers of Formula I are generally useful as flocculants, as in the clarification of water and aqueous suspensions. Thus, the addition to a sewage of about 0.01 to 0.5% by weight, based on the weight of suspended solids, of such a homopolymer or copolymer serves to flocculate the suspended matter and facilitate its removal by filtration or by settling and decantation. These homopolymers and copolymers are thus useful in the flocculation of aqueous suspensions of many types, and especially of domestic and industrial wastes having neutral, acidic or alkaline character. As mentioned hereinbefore, they can be used as paper sizing and wet strength agents and as anchoring agents for other sizing materials applied in aqueous dispersions of suspensions. They are also effective as retention aids in the preparation of mineral filled papers wherein they enhance the anchoring of the filler to the fibers and thereby clarify the white water obtained and improve the efficiency of use of the filler. The sizing and flocculation effects are generally effective at all pH values of the systems to which they are applied.

Copolymers containing from 0.25% to 25% or more by weight of units derived from one or more monomers of Formula I are useful for many purposes. For example, copolymers of acrylonitrile with 0.25 to 15% of such units are particularly useful for forming fibers and films having improved dyeability, greater resistance to the development of electrostatic charges by frictional contact, and better feel because of greater moisture adsorption. Copolymers of about 0.5% to 30% or more of a monomer of Formula I with an ester of acrylic acid or of methacrylic acid such as ethyl acrylate, butyl acrylate, 2-ethylhexyl acrylate, methyl methacrylate with or without styrene or vinyltoluene, are quite satisfactory when applied with a minor amount (5 to 25% by weight based on the weight of the copolymer) of an aminoplast condensate, e.g. that of formaldehyde with urea, melamine or N,N'-ethyleneurea for the stabilization of wool fabrics against shrinkage on washing, for the bonding of nonwoven fabrics, for the finishing of leather, as a binder for pigmented compositions, for the pigment-dyeing of textiles, for the production of mineral-coated papers, and for lithographic inks, for the sizing of paper, and as thermosetting coatings for application to metals, wood, plastics, glass, masonry of all types, plaster walls, etc. The coatings produced are resistant to the development of static electricity on frictional contact.

The homopolymers of a monomer of Formula I, especially those wherein A has 2 to 3 carbon atoms and $R^0$, $R'$, $R^2$, $R^3$, and $R^4$ have 1 or 2 carbon atoms each, and preferably only 1 carbon atom each, copolymers consisting essentially of two or more such monomers, and copolymers of (a) about 0.5% to 30% by weight or more of one or more such monomers with (b) methacryloxyethyltrimethylammonium chloride or acryloxyethyltrimethylammonium chloride are of special value in providing paper with higher conductivity for use in specialty applications such as electrostatic copy paper, electrographic printing, and other applications where paper, with lower than normal electrical resistivity is required. These water-soluble linear homopolymers and copolymers of the present invention may have molecular weights in the range of about 20,000 to 2,000,000 or more. A third group of copolymers may be made by the direct polymerization of the quaternary monomers of types (a) and (b) or their salts. Alternatively, a homopolymer of a di($C_1$-$C_2$)alkylamino($C_2$-$C_3$)alkyl acrylate or methacrylate, such as dimethylaminoethyl acrylate or methacrylate, may be made and this amine-containing polymer may be simultaneously quaternized with the components of a mixture of a methyl halide, such as methyl chloride, with one or more of the alkylating agents mentioned hereinabove wherein $R^2$, $R^3$, and $R^4$ each have 1 or 2 carbon atoms, preferably only one. The methyl halide and the other alkylating agent are present in the mixture in the proportions to provide 0.5 to 30% by weight of (a) and the balance of component (b) of the copolymer.

When poymers in lower molecular weight range are desired, the polymerization of the amine, its salt, or its quaternary may be effected at elevated temperatures, e.g. 40 to 60° C. or higher using conventional initiator systems, such as ammonium persulfate with or without sodium hydrosulfite. If desired, a chain transfer agent, such as mercaptoethanol, may be used. The higher molecular weight polymers may be obtained at lower temperatures, such as 5 to 10° C. and using concentrations of 60% or more with dilution to facilitate handling as polymerization progresses.

To prepare an electroconductive paper, the Formula I homopolymers and copolymers and the copolymers of (a) and (b) hereinabove defined (see next to last preceding paragraph) may be applied to the paper, or cellulosic web, by the conventional methods used for that purpose, e.g., coating, dipping, brushing, or by wet end addition, etc. The paper used may have a basis weight of 30 to 75 lbs., preferably 30–55 lbs. per 3000 sq. ft. The amount of polymer applied to the paper will generally vary within the range of about 1 to 8% (weight) pick-up, depending upon the particular polymer and paper combination used and the degree of electroconductivity which is desired. In some cases, still less might be used. There seems to be no operative upper limit to the amount of polymer applied, except to the extent this is determined by economics. It will therefore be appreciated and understood that the overall range of from about 1% to about 8% pick-up (by weight) is simply a statement of the required amount of polymer to confer electroconductivity properties to the cellulosic web substrate which will adapt it to most commercial uses mentioned above.

As compared to papers made with the water-soluble quaternary ammonium polymers heretofore recommended for improving the electroconductivity of electrostatic reproductive paper, the papers made with the polymers of the present invention, especially the copolymers containing 0.5 to 30 weight percent of units of Formula I and about 1 to 20 weight percent of reactive comonomer, e.g. containing an N-methylol or a glycidyl group as described hereinabove with the balance to make 100% of (meth)acryloxyethyltrimethylammonium chloride units having outstanding electroconductivity and the advantage of retaining their electroconductivity for longer periods of time. This is apparently attributable to the fact that on drying the paper after impregnation or coating thereof with the copolymers, they are cross-linked to a water-insoluble condition and/or reacted with the cellulose of the paper.

The fact that these copolymers are somewhat cross-linked and/or reacted with the paper on drying also provides an additional advantage of reducing the tendency to block or eliminating it entirely so that the coated paper carrying the electroconductive material can be rolled on itself without fear of damage when it is unrolled for later use. Also, the crosslinked and/or reacted condition reduces the sensitivity to organic solvents and aqueous media so that the topcoating layers of the photoconductive material such as zinc oxide in a binder dissolved or dispersed in a solvent or in an aqueous medium does not cause any appreciable leaching of the electroconductive agent from the paper at the time of application of the topcoating. Examples of such topcoating layers include styrene-butadiene latices, solutions in an organic solvent or dispersions in water of a polymer containing from 3 to 50% by weight of acid such as a copolymer of styrene and maleic anhydride, a copolymer of 95% butyl acrylate and 5% itaconic acid or of 70% ethyl acrylate and 30% acrylic acid or methacrylic acid, partially hydrolyzed polyvinyl acetate and alkali-soluble cellulose esters such as carboxyethyl cellulose as well as water-soluble cellulose ethers such as carboxyethy cellulose as well as water-soluble cellulose ethers such as hydroxyethyl cellulose. Such topcoating layers contain zinc oxide as well as one of the binders just mentioned and may contain a dye-sensitizer.

To assist those skilled in the art to practice the present invention, the following modes of operation are suggested by way of illustration, parts and percentages being by weight and the temperature in ° C. unless otherwise specifically noted.

(1)(a) A 2-liter glass polymerization flask is charged with 1000 g. of deionized water and sparged with nitrogen for one hour. The solution is cooled to 15° C. and 138.5 g. of 37% aqueous hydrochloric acid is added, followed by 220 g. of dimethylaminoethyl methacrylate. The temperature rises to 30° C. and the mixture is further warmed to 32° C. Then, 10 ml. of a 0.1 N solution of $FeSO_4 \cdot 7H_2O$, 1.5 g. of ammonium persulfate, and 1.5 g. of sodium hydrosulfite are added. The temperature of the mixture rises to 42° C. Forty-five minutes after the initial catalyst addition, 0.2 g. of ammonium persulfate and 0.2 g. of sodium hydrosulfite are added. Charges of 0.1 g. of ammonium persulfate and 0.1 g. of sodium hydrosulfite are added 30 minutes later, followed by 0.05 g. of ammonium sulfate and 0.05 g. of sodium hydrosulfite 30 minutes later. The polymer solution at 25° C. has a solids content of 21.7%, a Brookfield viscosity of 55 centipoises, and an amine content of 1.06 milliequivalents per gram.

(b) A 100 g. solution of poly(dimethylaminoethyl methacrylate hydrochloride), prepared as described in part (a) hereof and containing 1.21 milliequivalents of amine per gram, is mixed with 20.05 g. of (2,3-epoxypropyl)trimethylammonium chloride. The mixture is heated at 60° C. for two hours, and the pH is maintained at 7.0 by addition of 10% aqueous sodium hydroxide as needed. After two hours at 60° C. and 18 hours at 25° C., quaternization is essentially complete as judged by the lack of amine functionality upon acid-base titration. The pH of the polymer solution is adjusted to pH 3 with 37% aqueous hydrochloric acid to give a solution of a polymer of Formula I having 36.6% solids and a Brookfield viscosity of 265 centipoises.

(c) Drawdown coatings on a 3 x 4 inch glass plate are prepared (100 mg. polymer/10 sq. in. measured at 50% relative humidity), and the surface resistivity of these films is measured in a dry-box at 15% relative humidity. Sixteen measurements are made of the surface resistivity. The average log of surface resistivity (ohms/square) is 9.20 whereas two commercial products show 8.74 and 8.81.

(2)(a) A solution (100.0 g.) in water containing 22 g. of the hydrochloride of dimethylaminoethyl methacrylate is mixed with 20.5 g. of (2,3-epoxypropyl)trimethyl-ammonium chloride. The mixture is heated at 50° C. for 5 hours at a pH of 7.0–7.5 and allowed to stand for 24 hours at 25° C. Quaternization is essentially complete. The solution is adjusted to pH 3 with 37% hydrochloric acid.

(b) The monomer (resulting from part (a) hereof) of the formula

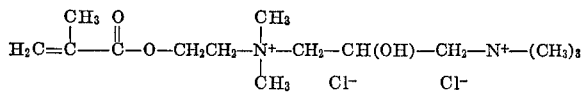

is polymerized by the addition, at 65° C., of 1 ml. of a 0.1% solution of FeSO$_4$·7H$_2$O, 0.2 g. of ammonium persulfate and 0.3 g. of sodium hydrosulfite. The temperature is maintained at 65° C. for one hour, then raised to 85° and 0.05 g. of ammonium persulfate and 0.05 g. of sodium hydrosulfite are added. After one hour at 85° C. the solution is cooled to 25° C. to provide a polymeric solution of 31.6% solids.

(3) Procedures (2)(a) and (2)(b) are repeated six times except that in each instance the amine is replaced by a molar equivalent amount of a different one of the following amines:

(a) 3-(dimethylamino)propyl acrylate
(b) 2-(dimethylamino)propyl methacrylate
(c) 2-(dimethylamino)hexyl methacrylate
(d) 4-(dimethylamino)butyl acrylate
(e) 2-(diethylamino)ethyl acrylate
(f) 2-(dibutylamino)ethyl methacrylate (4) Each of the polymer solutions obtained in (3) above is diluted with water to a concentration of 27% and samples of nylon fabric are immersed in the resulting solutions, and then dried in air. The resulting fabrics are improved in resistance to accumulation of electric charges on rubbing as compared to a sample of the same fabric but untreated.

(5) Each of the polymers of (3) above is formulated with hydroxyethylated starch and kaolinite clay and applied to paper in the following manner. One part of the respective polymer, one part of a hydroxyethylated starch available commercially under the name Pen Gum 280, and one part of kaolinite clay are mixed to produce a 30% solids mixture. This formulation is applied at various levels from 1.5 lbs. to 2.75 lbs. per 3000 sq. ft. to a paper base stock (40 lb./3000 sq. ft. paper made from bleached pulp beaten to a Canadian Standard Freeness of 200 ml.) typical of that used for Electrofax® copy paper by means of wire wound rods, and dried for one minute at 180° F. The resulting papers show reduced resistivity and can be used as electrostatic reproductive papers.

(6) Each of the polymer solutions obtained in (3) above are introduced into separate portions of a digester sewage sludge containing 10 grams of suspended matter of predominantly organic character per 100 cc. volume and having a pH of 7.4. The amount of solution introduced is such as to provide 0.25 g. of polymer solids per 100 g. of suspended solids in the sewage.

(7)(a) A 100 g. portion of a 50% solution of a homopolymer of 3-(dimethylamino)propyl methacrylate hydrochloride containing about 2.55 milliequivalents per gram of solution is mixed with 39 g. of (2,3-epoxypropyl)trimethylammonium chloride. The mixture is heated at 60° C. for two hours at a pH of 7.0–7.5. Then, after 18 hours at 25° C., quaternization is essentially complete as judged by the lack of amine functionality upon acid-base titration. The pH of the polymer solution is adjusted to pH 3 with 37% aqueous hydrochloric acid.

(b) Part (a) is repeated four times replacing the 50% homopolymer solution with a 100 g. portion of a different one of the following:

(1) a 45% solution of poly(2-(dimethylamino)-propyl acrylate hydrochloride)
(2) a 55% solution of poly(2-(diethylamino)-ethyl methacrylate hydrobromide)
(3) a 55% solution of poly(4-(dimethylamino)-butyl acrylate hydrobromide)
(4) a 58% solution of poly(6-(dimethylamino)-hexyl acrylate hydrobromide).

(c) Procedure (6) is repeated using the polymers obtained in (7)(a) and (b)(1), (b)(2), (b)(3), and (b)(4) with similar results.

(8) A reaction vessel similar to those previously described but provided with four addition funnels (a, b, c, and d) is charged with 632 g. of H$_2$O and 2 ml. of 0.1% FeSO$_4$ solution. This solution is heated to 70° C. and purged with nitrogen. The supply containers of the addition funnels are charged in the following manner: (a) a solution of 2.0 g. of ammonium persulfate in 50 g. of H$_2$O; (b) 2.0 g. of sodium metabisulfite dissolved in 50 g. of H$_2$O; (c) a monomer mixture of 90 g. of dimethylaminoethylacrylate and 100 g. of methyl acrylate; and (d) 67.2 g. of 37% hydrochloric acid. The kettle is then primed with 7 ml. of the HCl solution and 5 ml. of the initiator solution. All the remaining solutions are gradually added over a 1-hr. period such that the temperature is maintained between 69 and 71° C. An additional 10 g. of dimethylaminoethyl acrylate is then added over a 5-min. period. The completed solution polymer has a pH of 3.1 at 23.7% solids. A 300 g. sample of this solution is diluted with 100 g. of H$_2$O and 38.5 g. of (2,3-epoxypropyl)trimethylammonium chloride is added. After 18 hours at 25° C., amine titer confirms complete quaternization of the copolymer.

The copolymer thus obtained is useful in the flocculation of suspended solids as in procedure (6) above, and in the antistatic treatment of hydrophobic textiles as in procedure (4) above.

(9) A slurry of 19.7 g. of calcium hydroxide in 100 g. of water is added to 500 g. of the polymer solution obtained in (1)(a). The solution is stirred for 6 hours under a positive pressure (30 mm. of Hg) of methyl chloride. At this time, 10 g. of (2,3-epoxypropyl)trimethylammonium chloride is added and the mixture is stirred another 16 hours Titration of amine functionality indicates that quaternization is complete. The pH of the solution is adjusted to 1.2 with aqueous hydrochloric acid to give a polymer solution of about 22% solids. This material functions as a conductivity aid for electroconductive paper when formulated in the manner described in procedure (5).

(10) The papers obtained in (5) and in (9) are given a dielectric coating layer by topcoating with the following formulation:

| Material: | Parts |
|---|---|
| Ammonium salt of a copolymer of 50% butyl acrylate, 25% methyl methacrylate, 10% styrene, and 15% methacrylic acid (35% aqueous solution) | 57.2 |
| Copolymer of 32% ethyl acrylate and 68% methacrylic acid (20% aqueous dispersion) | 1.25 |
| Photoconductive ZnO (Photox 801) | 140 |
| Bromphenol Blue in methanol (½ % solution) | 5.6 |
| Ammonium hydroxide (28%) | 0.8 |
| Water | 27.1 |

This coating is applied at 15 lb./3000 sq. ft. and air-dried. The polymers containing the quaternary ammonium groups of Formula I show little or no migration into the dielectric coating and good images are produced.

(11)(a) There is charged to a glass reaction vessel 1200 g. of water, 40 g. of a 70% solution of tert-octylphenoxypoly(40)-ethoxyethanol and 8 g. of sodium metabisulfite. This solution is purged with nitrogen and heated to 55° C. Three addition funnels (a, b, and c) are charged as follows: (a) with a mixture of 120 g. of butyl acrylate, 120 g. of styrene, (b) with 160 g. of the bis-quaternary monomer in (1)(b) above in 100 ml. of water, and (c) with 8 g. of ammonium persulfate dissolved in 90 g. of water. The solutions are added concurrently over 1 hour while the temperature is maintained at 55–60° C. for this time and for one hour thereafter.

(b) Part (a) is repeated six times except that the monomeric bis-quaternary compound therein used is replaced by the following bis-quaternary monomers in the amounts stated:

(1) 180 g. of the bis-quaternary obtained in (3)(a) above,
(2) 200 g. of the bis-quaternary obtained in (3)(b) above,
(3) 120 g. of the bis-quaterary obtained in (3)(c) above,
(4) 80 g. of the bis-quaternary obtained in (3)(d) above,
(5) 60 g. of the bis-quaternary obtained in (3)(e) above,
(6) 10 g. of the bis-quaternary obtained in (3)(f) above,
(7) 5 g. of the bis-quaternary obtained in (3)(a) above.

(c) The copolymers obtained in parts (a) and (b) are applied to nylon textile fabrics by the procedure of (4) above to provide an antistatic finish thereon.

The copolymers of part (a) and parts (b)(1), (b)(2), (b)(3), (b)(4), and (b)(5) are effective flocculants when applied at levels of 0.25 to 0.5%, based on suspended solids, to digested sewage sludges as in procedure (6).

(12)(a) To 100 g. of a 20% aqueous solution of dimethylaminoethyl methacrylate hydrochloride there is added 20 g. of (2,3-epoxypropyl)trimethylammonium chloride. The solution is heated at 60° C. for four hours at a pH of 7.0–7.5. Then after 18 hours at 25° C., titration for amine functionality shows that quaternization is essentially complete.

(b) Part (a) hereof is repeated seven times except that the methacrylate salt solution is replaced with the amounts hereinafter stated of an aqueous 20% solution of a different one of the following acrylate salts:

(1) 105 g.; 3-(dimethylamino)propyl methacrylate hydrochloride.
(2) 110 g.; 2-(dimethylamino)propyl acrylate hydrochloride.
(3) 115 g.; 4-(dimethylamino)butyl methacrylate hydrochloride.
(4) 115 g.; 2-(dimethylamino)butyl acrylate hydrochloride.
(5) 125 g.; 4-(dimethylamino)hexyl acrylate hydrochloride.
(6) 100 g.; diethylaminoethyl methacrylate hydrochloride.
(7) 115 g.; dibutylaminoethyl methacrylate hydrochloride.

(13) Each of the monomers of (12)(a) and (12)(b), parts (1) through (7) are homopolymerized by the polymerization procedure of (2)(b). The polymers are used as antistatic agents in procedure (4), flocculants in procedure (6) and as conductivity aids in the making of electrostatic reproduction papers as in procedure (10).

(14) Copolymers are produced by procedure (11)(a) hereinabove except that the bis-quaternary monomer used therein is replaced by the amount hereinafter stated of a respective one of the following bis-quaternary monomers:

(1) 65 g. of the bis-quaternary monomer obtained in (12)(a).
(2) 150 g. of the bis-quaternary monomer obtained in (12)(b)(1).
(3) 180 g. of the bis-quaternary monomer obtained in (12)(b)(2).
(4) 220 g. of the bis-quaternary monomer obtained in (12)(b)(3).
(5) 5 g. of the bis-quaternary monomer obtained in (12)(a).
(6) 10 g. of the bis-quaternary monomer obtained in (12)(b)(1).
(7) 20 g. of the bis-quaternary monomer obtained in (12)(b)(2).
(8) 40 g. of the bis-quaternary monomer obtained in (12)(b)(3).
(9) 100 g. of the bis-quaternary monomer obtained in (12)(b)(6).
(10) 125 g. of the bis-quaternary monomer obtained in (12)(b)(5).
(11) 10 g. of the bis-quaternary monomer obtained in (12)(b)(6).
(12) 15 g. of the bis-quaternary monomer obtained in (12)(b)(7).
(13) 70 g. of the bis-quaternary monomer obtained in (12)(b)(1).
(14) 90 g. of the bis-quaternary monomer obtained in (12)(b)(6).
(15) 80 g. of the bis-quaternary monomer obtained in (12)(b)(2).

(15) Each of the polymer solutions obtained in (13) and (14) above is formulated with hydroxyethylated starch and kaolinite clay and applied to paper as in (5) and (10) above. The resulting papers show reduced resistivity and can be used as electrostatic reproductive papers.

(16) Each of the polymer solutions obtained in (13), (14)(4), (14)(9), (14)(10), and (14)(15) above is formulated with hydroxyethylated starch and kaolinite clay and applied to paper as in (5) and (10) above. The resulting papers show reduced resistivity and can be used as electrostatic reproductive papers.

(17) To an aqueous solution of each of the monomers obtained in (12)(a) and (12)(b) there is added 25% caustic soda till a pH of 8 is attained. Then the solution is evaporated till the sodium chloride deposits, the latter is removed by filtration, and the resulting monomers in hydroxide form are converted to the nitrate salt form by the addition of 15% aqueous nitric acid to a pH of 5.

(18) A 1-liter 3-neck flask fitted with stirrer, condenser, thermometer, and addition funnel, is charged with 197 g. $H_2O$ and 100 g. of trimethylamine hydrochloride (1.05 moles). The solution is stirred and 98.8 g. (1.07 moles) of epichlorhydrin (ECH) is charged over a 0.5 hour period. The temperature is maintained at 40–45° by external cooling throughout the addition period and for one additional hour. Very little cooling is needed after the ECH addition is completed. The solution is transferred to a separatory funnel and extracted two times with 400 g. each of methylene chloride. The (3-chloro - 2 - hydroxy - propyl)trimethylammonium chloride (CHTAC) after extraction is 90% of that before extraction.

The glycidyltrimethylammonium chloride (GTAC) is generated by the slow addition of 61.0 g. (0.76 mole) of 50% NaOH solution to 324 g. (0.77 mole) of the CHTAC solution. The pH is never allowed to exceed 11 during the NaOH addition. The GTAC solution is then added to 585 g. (0.703 mole) of poly(dimethylaminoethyl methacrylate hydrochloride) solution of 22% solids at 60° C. The mixture is maintained at about 60° C. (no apparent exotherm) for 3 hours whereupon amine titration confirms the absence of all amines. The pH of about 7.5 is adjusted to 3 with concentrated HCl.

(19) The polymer solution obtained in (18) is formulated and applied to paper as in (5) above and then coated with dielectric topcoating as in (10) above. The resulting product is a good paper for electrostatic reproductive processes.

We claim:
1. A compound of the formula:

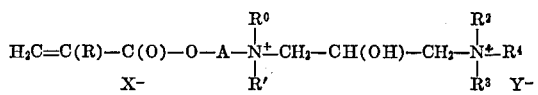

wherein

A is $(C_2-C_6)$-alkylene,
R is H or methyl,
$R^0$ is lower alkyl,

R' is lower alkyl,
R² is lower alkyl,
R³ is lower alkyl,
R⁴ is lower alkyl,
X is an anion, and
Y is an anion.

2. A compound as defined in claim 1 in which X is a halogen or nitrate ion and Y is a halogen or nitrate ion.

3. A polymer of a compound of claim 1.

4. A copolymer of (1) about 0.25% to 99.5% by weight of a compound of claim 1 with (2) at least one other monoethylenically unsaturated monomer having a group of the formula $H_2C=C<$.

5. A copolymer of 0.25 to 30% by weight of a compound of claim 1 with the balance to make 100% of (acryloxyethyl) or (methacryloxyethyl)trimethyl ammonium chloride.

References Cited
UNITED STATES PATENTS

| | | | |
|---|---|---|---|
| 3,689,468 | 9/1972 | Cenci et al. | 260—86.1 N |
| 3,694,393 | 9/1972 | Lewis et al. | 260—86.1 N |
| 3,314,927 | 4/1967 | Kelley | 260—86.1 N |
| 2,838,397 | 6/1958 | Gruntfest et al. | 260—89.5 N |

U.S. Cl. X.R.

117—124, 132, 138.8, 148, 161; 162—168; 260—29.6 R, 29.6 SQ, 29.6 CM, 63 N, 78.5 R, 79.3 M, 79.7, 80.8, 85.5 ES, 86.3, 86.7, 89.5 N, 486 R, 486 H, 851, 881, DIG. 17, DIG. 19